(12) United States Patent
Taniguchi

(10) Patent No.: US 9,344,609 B2
(45) Date of Patent: May 17, 2016

(54) ELECTRONIC DEVICE HAVING A CAM MECHANISM FOR DETECTING STATUS OF AN OPENING-AND-CLOSING UNIT

(71) Applicant: Panasonic Corporation, Osaka (JP)

(72) Inventor: Takuo Taniguchi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 14/156,801

(22) Filed: Jan. 16, 2014

(65) Prior Publication Data

US 2014/0198243 A1 Jul. 17, 2014

(30) Foreign Application Priority Data

Jan. 17, 2013 (JP) .................................. 2013-006021

(51) Int. Cl.
*H04N 5/225* (2006.01)
*H04N 5/232* (2006.01)

(52) U.S. Cl.
CPC ............ *H04N 5/2252* (2013.01); *H04N 5/2251* (2013.01); *H04N 5/23241* (2013.01); *H04N 5/23293* (2013.01)

(58) Field of Classification Search
CPC .......... H04N 5/23293; H04N 2101/00; H04N 5/232; H04N 1/2112; H04N 5/2251; H04N 5/2252; H04N 5/2253; H04N 5/2254; G08B 13/19619
USPC ........ 348/333.01–333.12, 373–376; 396/347, 396/535, 536
See application file for complete search history.

(56) References Cited

U.S. PATENT DOCUMENTS

| | | | | |
|---|---|---|---|---|
| 7,515,826 | B2 * | 4/2009 | Shibayama | 396/287 |
| 2001/0055071 | A1 * | 12/2001 | Kawai et al. | 348/333.06 |
| 2009/0295975 | A1 * | 12/2009 | Takahashi et al. | 348/333.06 |
| 2010/0128458 | A1 * | 5/2010 | Nagami | 361/825 |
| 2012/0081593 | A1 * | 4/2012 | Nakagawa et al. | 348/333.06 |
| 2012/0113308 | A1 * | 5/2012 | Ishikawa | 348/333.06 |

FOREIGN PATENT DOCUMENTS

| | | |
|---|---|---|
| JP | 2007-110214 A | 4/2007 |
| JP | 2009-281004 A | 12/2009 |
| JP | 2010-019918 A | 1/2010 |

* cited by examiner

*Primary Examiner* — Sinh Tran
*Assistant Examiner* — Selam T Gebriel
(74) *Attorney, Agent, or Firm* — Renner, Otto, Boisselle & Sklar, LLP

(57) ABSTRACT

An electronic device includes a housing, an opening-and-closing unit disposed on a side surface of the housing, and configured to be openable and closable to the housing, a hinge unit configured to have a cam groove formed thereon and to openably and closably couple the opening-and-closing unit with the housing, an electronic circuit board arranged inside the housing and having a switch which outputs a signal corresponding to a state of the switch, and a movable member that moves in conjunction with the cam groove formed in the hinge unit, along with the opening and closing of the opening-and-closing unit, the movable member being movable in a direction parallel to the side surface of the housing to change the state of the switch.

13 Claims, 7 Drawing Sheets

LCD IS NOT IN USE.
(DETECTION SWITCH: OFF)

LCD IS NOT IN USE.
(DETECTION SWITCH: OFF – ON)

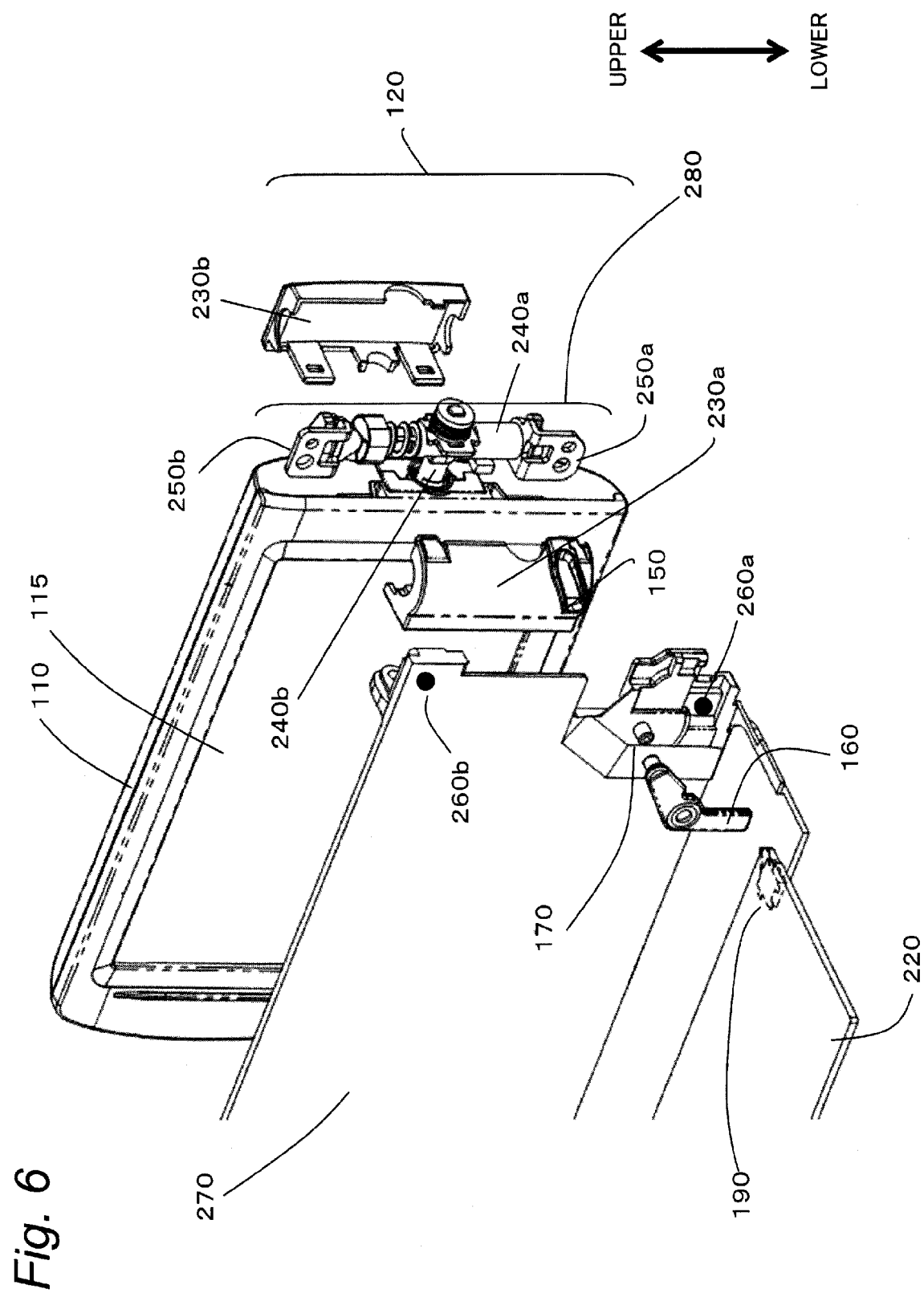

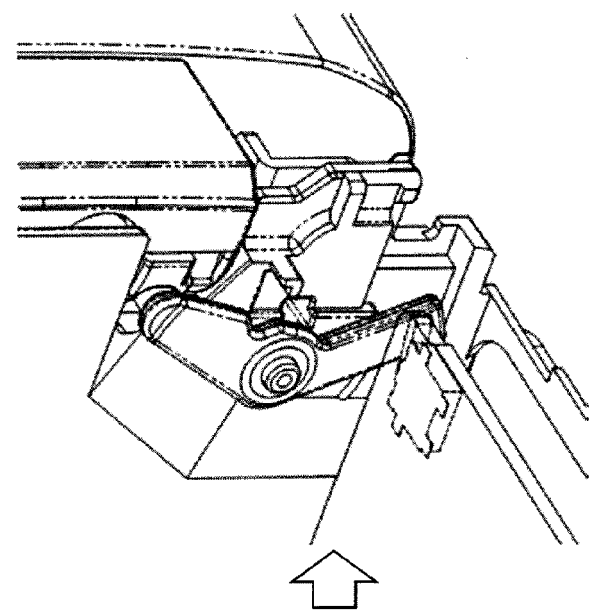
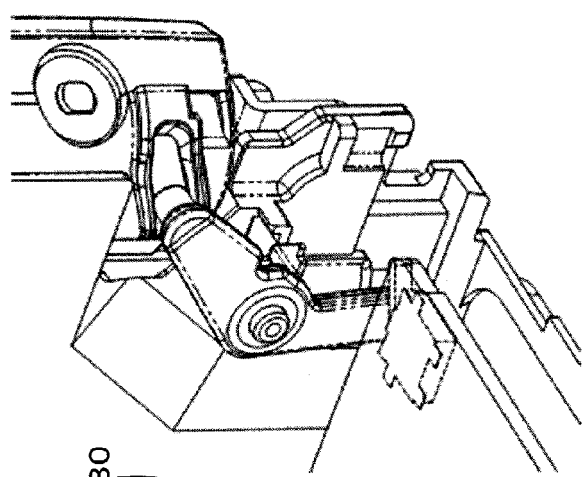
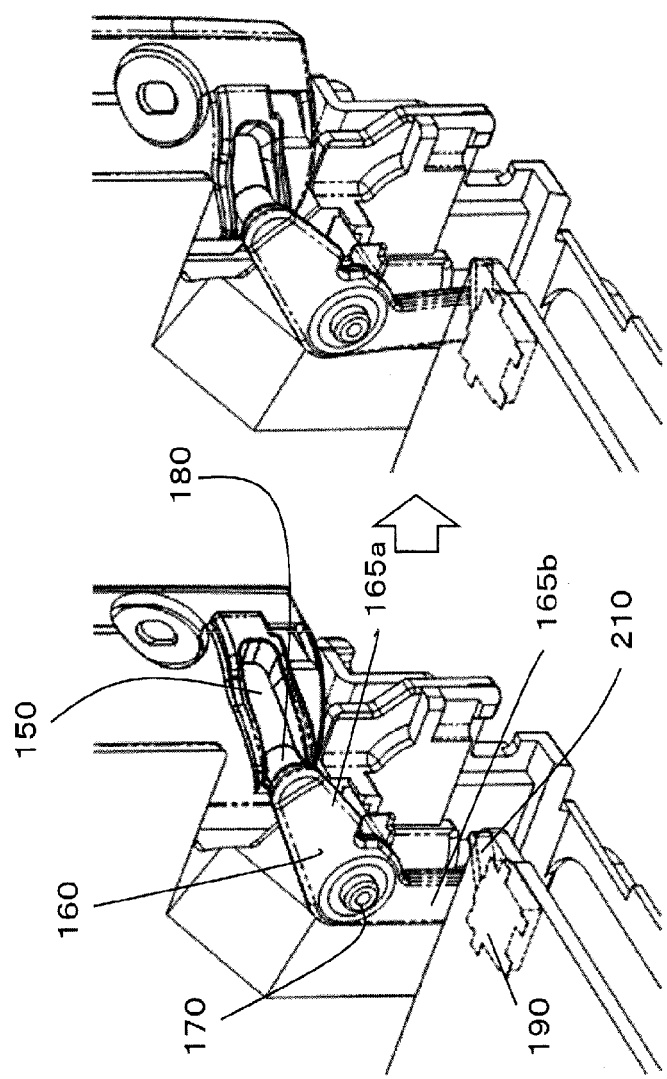

ELECTRONIC DEVICE HAVING A CAM MECHANISM FOR DETECTING STATUS OF AN OPENING-AND-CLOSING UNIT

BACKGROUND

1. Technical Field

The present disclosure relates to an electronic device having a hinge unit which is openably and closably coupled with an opening-and-closing unit on a main body thereof.

2. Related Art

In digital video cameras, there has been widespread use of products having an opening-and-closing unit. For example, JP 2007-110214 A discloses a mechanism for opening and closing an opening-and-closing unit (LCD) on a main body of a video camera.

Video cameras of this type control on/off of a power supply according to opening and closing of the opening-and-closing unit, and therefore, are provided with a mechanism for detecting opening and closing of the opening-and-closing unit.

The present disclosure provides an electronic device having a more compact mechanism for detecting opening and closing of a device.

SUMMARY

In one aspect, an electronic device includes a housing, an opening-and-closing unit disposed on a side surface of the housing, and configured to be openable and closable to the housing, a hinge unit configured to have a cam groove formed thereon and openably and closably couple the opening-and-closing unit with the housing, an electronic control circuit board arranged inside the housing and having a switch which outputs a signal corresponding to a state of the switch, and a movable member that moves in conjunction with the cam groove formed in the hinge unit, along with the opening and closing of the opening-and-closing unit, the movable member being movable in a direction parallel to the side surface of the housing to change the state of the switch.

According to the present disclosure, there can be provided an electronic device having a more compact mechanism in which opening and closing can be detected even in a limited space inside a housing thereof.

BRIEF DESCRIPTION OF DRAWINGS

FIG. 6 is an exploded perspective view of the opening-and-closing mechanism of the opening-and-closing unit; and FIGS. 7A to 7C illustrate a transition of operation of the opening-and-closing mechanism according to the opening and closing state of the opening-and-closing unit.

DETAILED DESCRIPTION OF PREFERRED EMBODIMENT

Hereinafter, detailed descriptions will be made of embodiments with reference to the drawings as appropriate. However, the detailed description more than necessary may be omitted. For example, detailed descriptions of well-known matters and repetitive descriptions for substantially identical configurations may be omitted. This prevents the following description from becoming unnecessarily redundant to facilitate understanding by those skilled in the art. It should be noted that the inventor(s) provides(provide) the accompanying drawings and the following description to make those skilled in the art fully understand the present disclosure, and does not intend to limit the subject matters described in the claims by the accompanying drawings and the following description.

First Embodiment

A digital video camera (one example of electronic device and imaging device) according to the first embodiment includes a hinge unit which openably and closably couples an opening-and-closing unit with a housing (or a case) of the digital video camera. An outer surface of the hinge unit is provided with a cam groove in a shape of part of a spiral. The digital video camera further includes an opening-and-closing lever having a projection portion which moves along the cam groove. The opening-and-closing lever rotates in a direction parallel to a side surface of a housing of the digital video camera with a movement of the projection portion along the cam groove. The cam groove and the opening-and-closing lever can convert a rotational movement of the opening-and-closing unit (liquid crystal display monitor 110) into a planar movement along the side surface of the housing. The digital video camera further includes an electronic control circuit board having a switch which outputs a signal corresponding to the opening and closing of the opening-and-closing unit. The opening-and-closing lever is arranged such that one end thereof can control ON/OFF of the switch. A suitable adjustment of the length of the opening-and-closing lever makes it possible to perform a switching operation, even if the hinge unit and the electronic control circuit board are spaced apart with a long distance.

Hereinafter, configuration and operation of the digital video camera according to the present embodiment will be described in detail with reference to the drawings.

Figure 1:
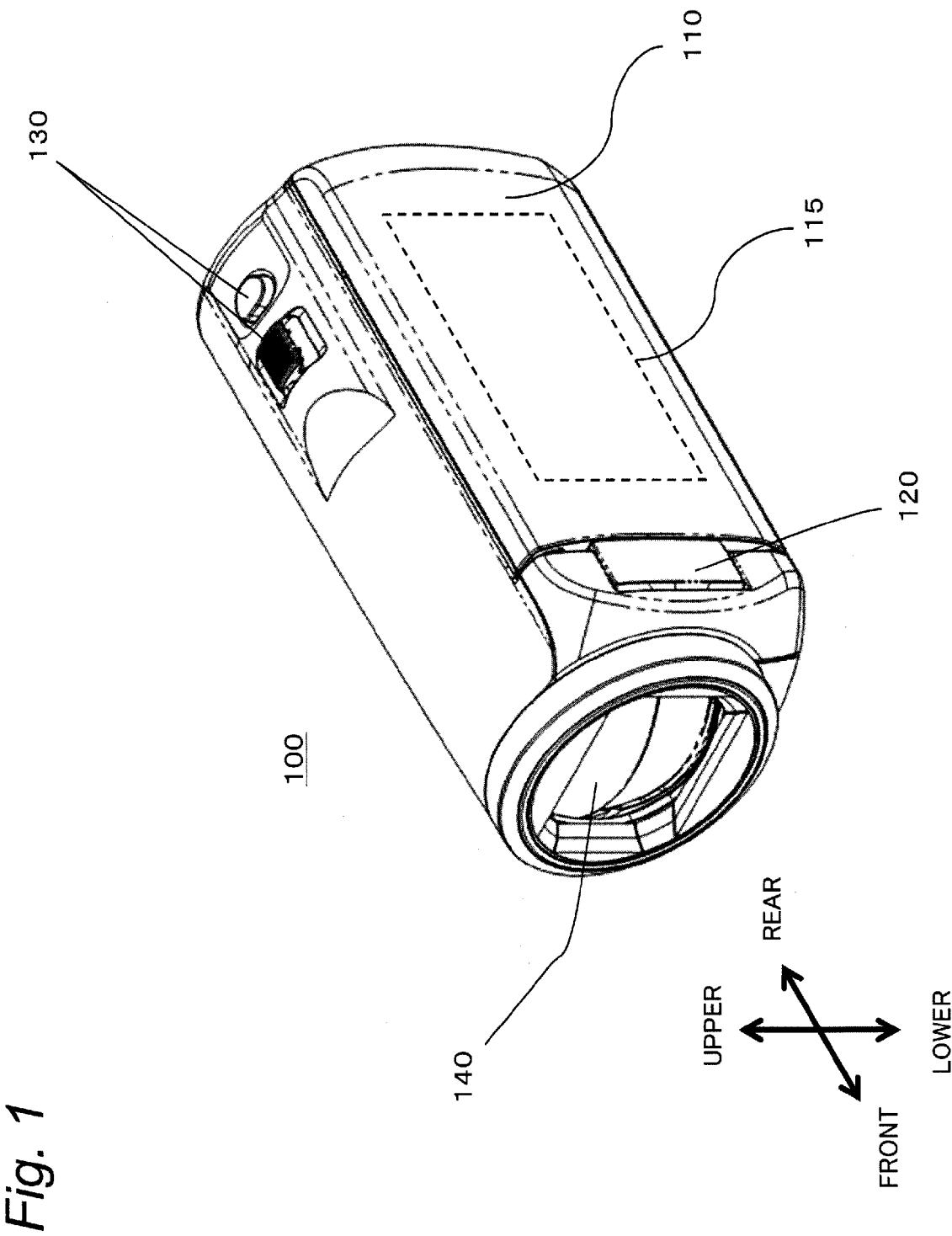
FIG. 1 is a perspective view of a main body of a digital video camera.

FIG. 1 is a perspective view of a main body of a digital video camera 100. As shown in FIG. 1, the digital video camera 100 is provided with an opening-and-closing unit 110 having a liquid crystal display monitor, a hinge unit 120, an operating section 130, a lens barrier 140, and the like. In the following description, "front", "rear", "upper", and "lower" to the digital video camera 100 are defined as respective directions shown in FIG. 1.

The opening-and-closing unit 110 is arranged so as to cover one of side surfaces of a housing of the digital video camera 100. The opening-and-closing unit 110 is provided with a liquid crystal display (LCD) monitor 115 on an inner surface (surface facing the housing of the digital video camera 100 in FIG. 1.

The hinge unit 120 is arranged at a front side of one of the side surfaces of the housing of the digital video camera 100. The hinge unit 120 includes a mechanism which couples the housing of the digital video camera 100 with the opening-and-closing unit 110. The hinge unit 120 allows the opening-and-closing unit 110 to open and close on the housing of the digital video camera 100.

The operating section 130 is arranged on an upper surface of the housing of the digital video camera 100. The operating section 130 is electrically connected to a terminal on the electronic control circuit board arranged inside the housing of the digital video camera 100. When the operating section 130 is operated by a user, an operation instruction signal is transmitted from the operating section 130 to a microcomputer on the electronic control circuit board arranged inside the housing of the digital video camera 100. With this arrangement, the user can operate the digital video camera 100 through the operating section 130.

The lens barrier 140 is arranged on an outer surface of the housing of the digital video camera 100. The lens barrier 140 is a member for protecting an optical system inside the housing of the digital video camera 100.

Figure 2:
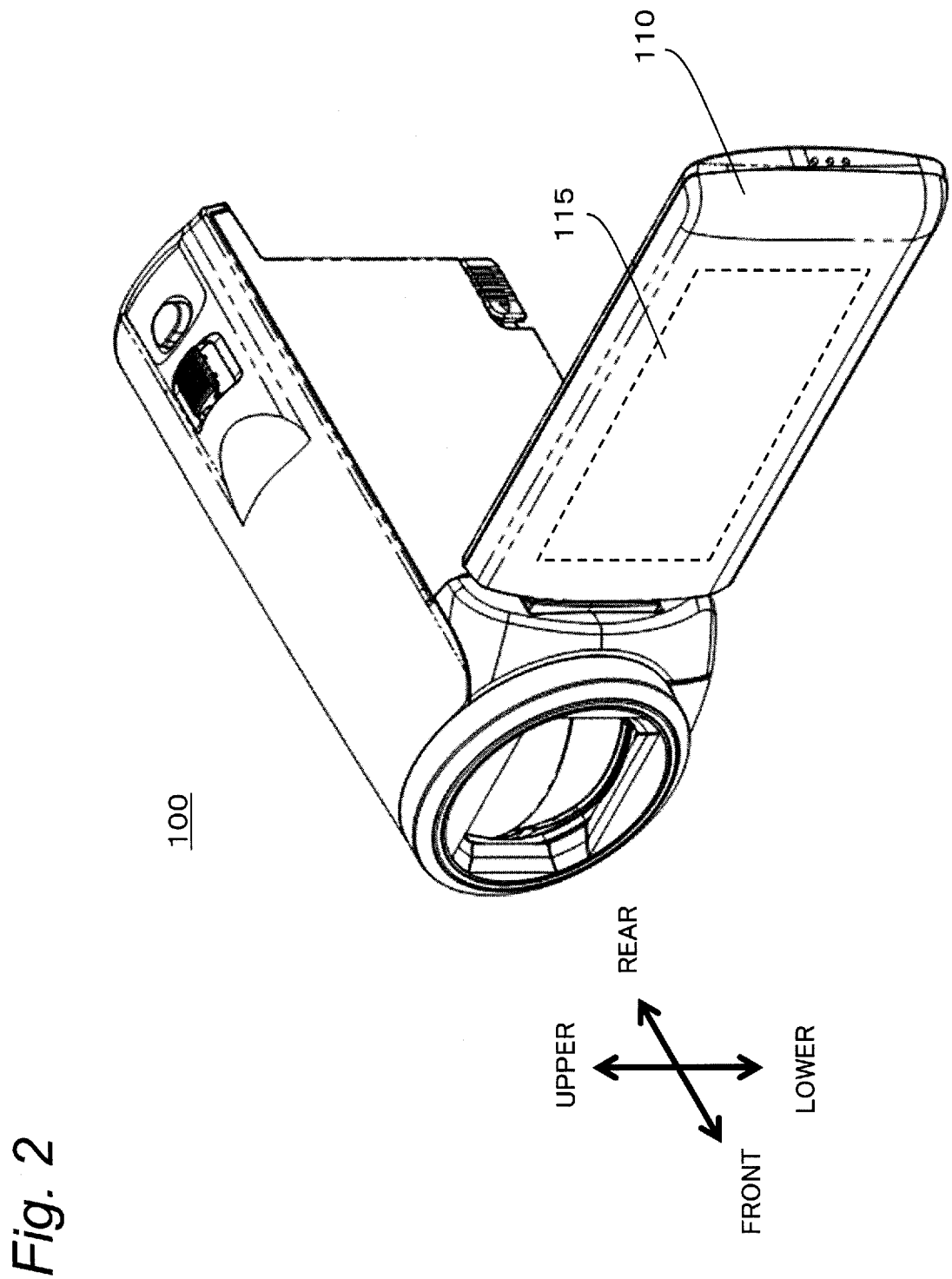
FIG. 2 is a perspective view of the digital video camera in an open state (at the time of using a liquid crystal display monitor) of an opening-and-closing unit.

FIG. 2 is a perspective view of the digital video camera 100 at the time of using the liquid crystal display monitor 115 provided in the opening-and-closing unit 110. As described above, the opening-and-closing unit 110 can take the open state, as shown in FIG. 2, with respect to the digital video camera 100 via the hinge unit 120. By opening the opening-and-closing unit 110 on the housing of the digital video camera 100, a user can determine a composition of a subject, while viewing a through image displayed on the liquid crystal display monitor 115.

Figure 3:
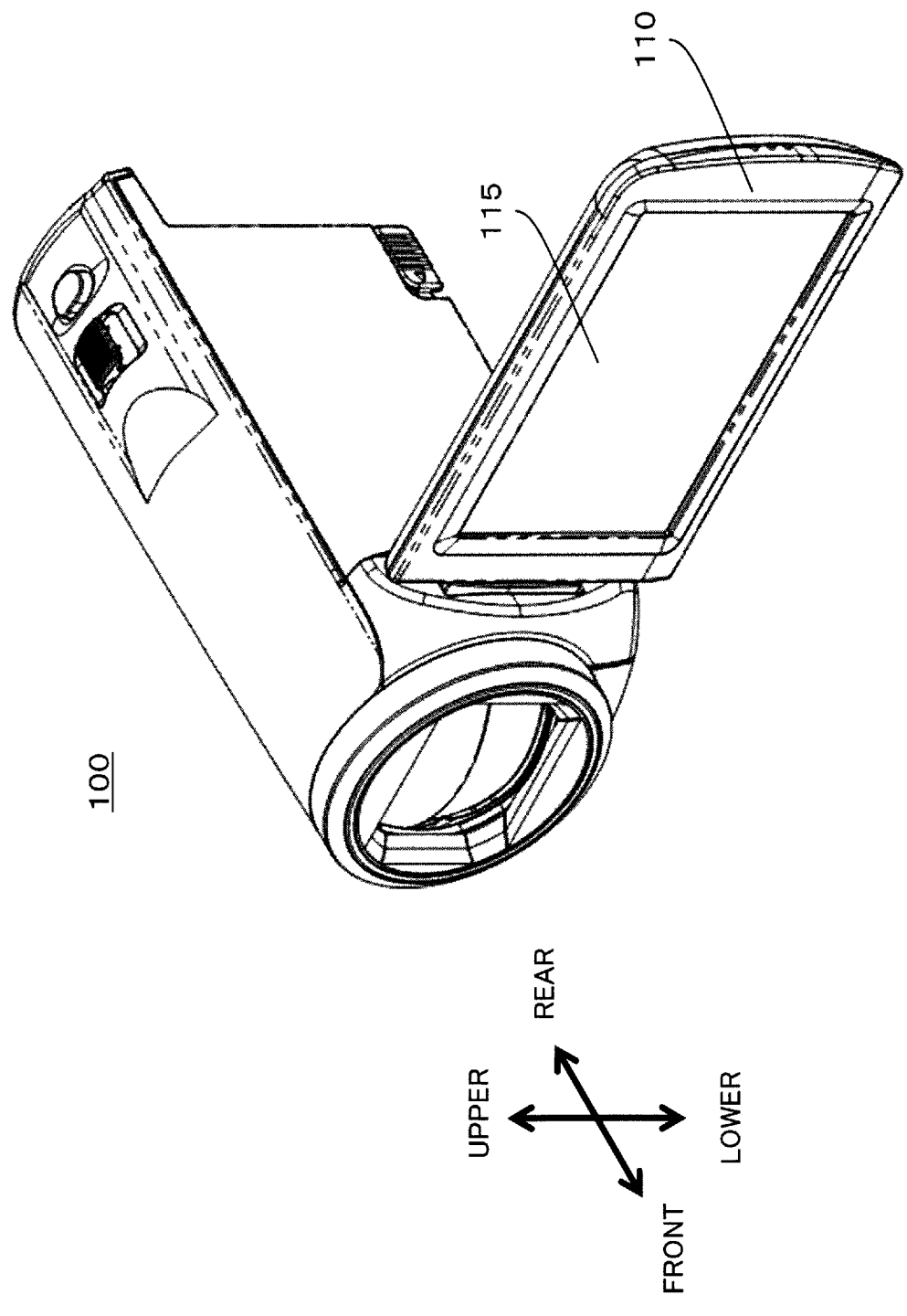
FIG. 3 is a perspective view of the digital video camera when the opening-and-closing unit (liquid crystal display monitor) is reversed inside out.

FIG. 3 is a perspective view of the digital video camera 100 when the opening-and-closing unit 110 (liquid crystal display monitor 115) is reversed inside out. As shown in FIG. 3, the opening-and-closing unit 110 can be further reversed inside out from the open state on the digital video camera 100, such that the liquid crystal display monitor 115 faces a front side of the digital video camera 100. With this arrangement, a user as a subject can check how an image of the subject is captured, while viewing the through image displayed on the liquid crystal display monitor 115.

Figure 4:
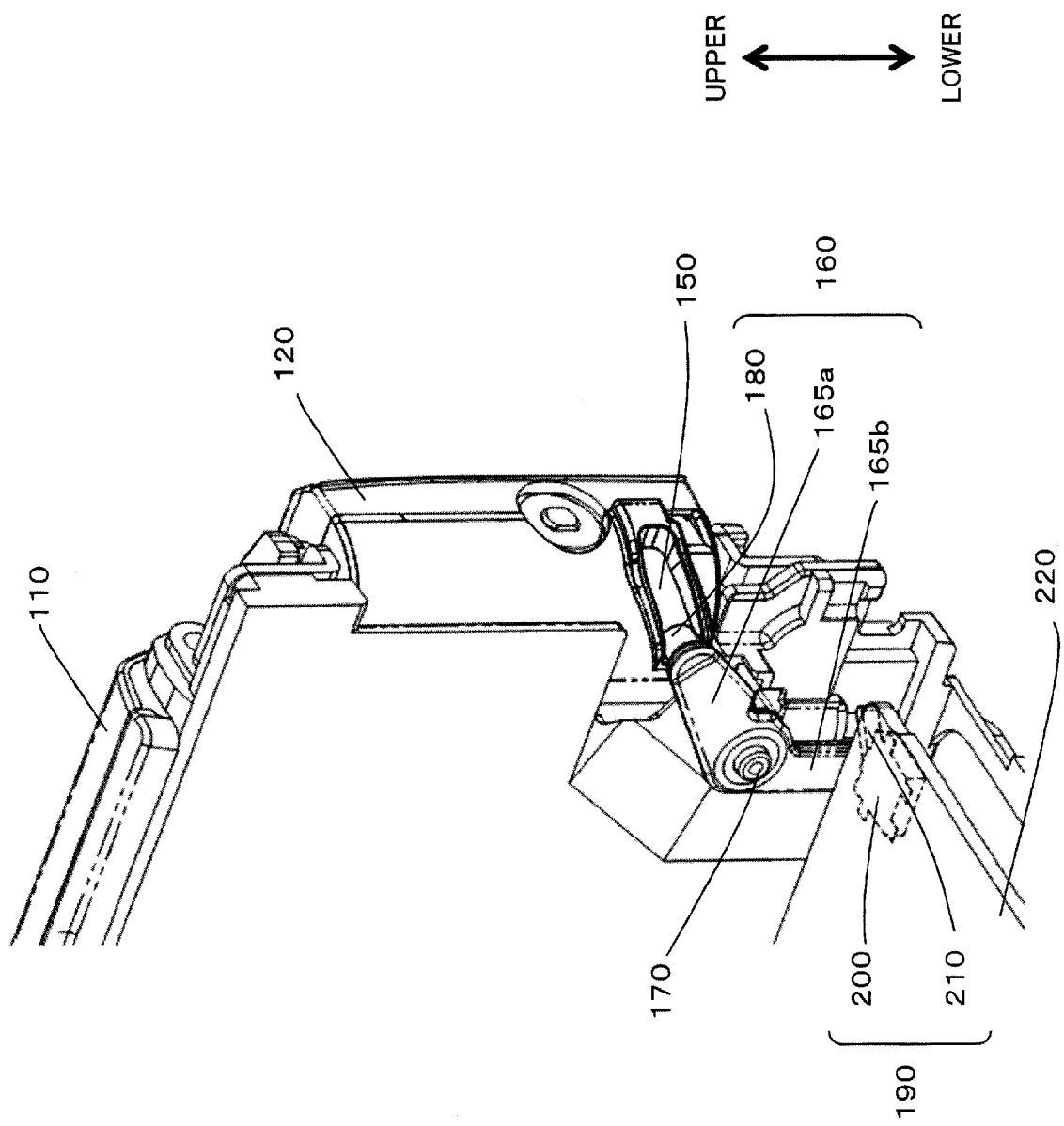
FIG. 4 is a perspective view of an opening-and-closing mechanism of the opening-and-closing unit.

FIG. 4 is a perspective view of an opening-and-closing mechanism of the opening-and-closing unit 110. FIG. 4 shows a configuration of the opening-and-closing mechanism of the opening-and-closing unit 110, which is seen from an inside of the housing of the digital video camera 100. As shown in FIG. 4, the opening-and-closing mechanism of the opening-and-closing unit 110 includes the hinge unit 120, an opening-and-closing lever 160, a switch 190, an electronic control circuit board 220, and the like.

Figure 5:
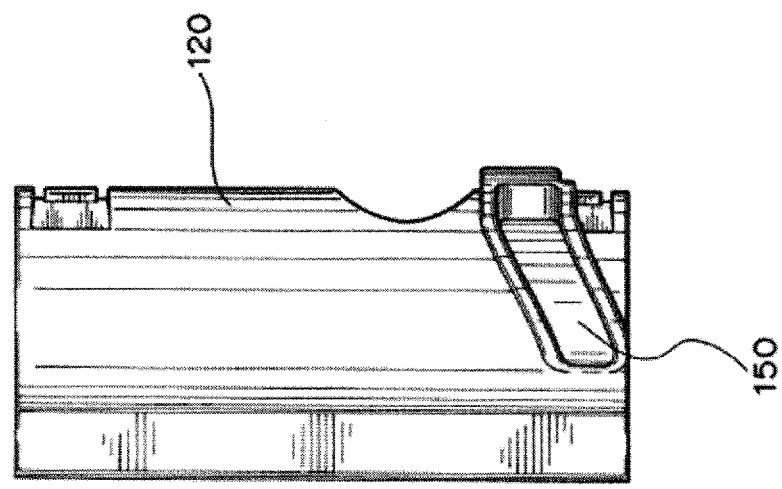
FIG. 5 illustrates a cam groove formed in a hinge unit.

As shown in FIG. 5, a cam groove 150 is formed along an outer circumference of the hinge unit 120. The cam groove 150 has a shape of part of the spiral along an outer surface of the hinge unit 120. Specifically, the cam groove 150 is formed along the outer surface of the hinge unit 120 so as to extend obliquely upward from an end portion of the hinge unit 120 toward a central portion thereof.

As shown in FIG. 4, the cam groove 150 is formed in a lower region of the hinge unit 120, i.e., in a region closer to the electronic control circuit board 220. Forming the cam groove 150 in such a position allows the opening-and-closing lever 160 to be closer to the switch 190, so that the length of the opening-and-closing lever 160 can be shortened. In addition, an upper region of the hinge unit 120, i.e., a region away from the electronic control circuit board 220 of the hinge unit 120, can be effectively used for other purposes.

A lever pin 180 to be inserted into the cam groove 150 is formed at a rear side of an end of an upper portion 165a of the opening-and-closing lever 160. A central portion of the opening-and-closing lever 160 is provided with a hole into which a lever rotating shaft 170 is inserted. In the opening-and-closing lever 160, a rotation center is positioned by the lever rotating shaft 170. The opening-and-closing lever 160 can be rotated about the position of the lever rotating shaft 170 as a center. An end of a lower portion 165b of the opening-and-closing lever 160 is in contact with a part of the switch 190 to activate the switch 190.

The switch 190 detects opening and closing of the opening-and-closing unit 110 to output a signal showing a detection result. The switch 190 includes a switch body 200 and a switch lever 210. The switch body 200 is arranged on the electronic control circuit board 220. The switch lever 210 is provided in the switch body 200, and is configured to change its orientation (orientation in an ON state/orientation in an OFF state) with respect to the switch body 200.

Normally, the switch lever 210 is biased to maintain the orientation in the OFF state. By pressing down the switch lever 210 against a bias with respect to the switch lever 210 with the lower portion 165b of the opening-and-closing lever 160, the orientation of the switch lever 210 can be changed from the orientation of the OFF state to the orientation of the ON state. Here, the OFF state corresponds to a state where the opening-and-closing unit 110 is closed, while the ON state corresponds to a state where the opening-and-closing unit 110 is opened. The switch body 200 is electrically connected to other electronic components on the electronic control circuit board 220. With a change in the orientation of the switch lever 210, a signal corresponding to a state of the orientation (ON state/OFF state), or corresponding to the opening and closing of the opening-and-closing unit 110 can be transmitted to the other electronic components. For example, based on the signal outputted from the switch 190 corresponding to opening and closing of the opening-and-closing unit 110, ON/OFF of an image display on the liquid crystal display monitor 115 is controlled. In the above description, as an example, the switch lever 210 is normally biased to maintain the orientation of the OFF state. However, the present disclosure is not limited thereto, and the switch lever 210 may be biased to maintain the orientation of the ON state.

FIG. 6 is an exploded perspective view of the opening-and-closing mechanism of the opening-and-closing unit 110. FIG. 6 shows a configuration of the opening-and-closing mechanism of the opening-and-closing unit 110 in an exploded manner, as viewed from an inner side of the housing of the digital video camera 100.

The hinge unit 120 includes hinge cases 230a and 230b, and a hinge 280.

The hinge case 230a is a case member which can be integrally coupled to the hinge case 230b. The hinge cases 230a and 230b are coupled to each other to encompass the hinge 280. As described above, the hinge case 230a is provided with the cam groove 150.

The hinge 280 is configured by hinge shafts 240a and 240b. The hinge shaft 240a is orthogonally combined with the hinge shaft 240b.

Fixing plates 250a and 250b formed at both ends of the hinge shaft 240a are screwed with screws and screw holes 260a and 260b formed in a housing 270, respectively. With this arrangement, the hinge shaft 240a is fixed to the housing 270. On the other hand, the hinge shaft 240b is coupled to a side surface of the opening-and-closing unit 110.

The hinge shaft 240a supports opening and closing operation (rotational movement) of the opening-and-closing unit 110 in a first direction with respect to the housing of the digital video camera 100. On the other hand, the hinge shaft 240b supports rotational operation (reverse movement) in a second direction (direction orthogonal to the first direction) from a state in which the opening-and-closing unit 110 is opened with respect to the digital video camera 100.

As described above, action of the hinge 280 enables the opening-and-closing unit 110 to perform the rotational movement of opening and closing in the first direction and a rotational movement in the second direction from the open state, with respect to the digital video camera 100.

FIGS. 7A to 7C show a transition of operation of an opening-and-closing mechanism portion along with the opening and closing of the opening-and-closing unit 110. FIGS. 7A to 7C show details of the opening-and-closing mechanism portion in a state where the liquid crystal display monitor 115 of the opening-and-closing unit 110 faces a side of the housing of the digital video camera 100.

FIG. 7A shows a non-use state of the liquid crystal display monitor 115. The non-use state is a state in which the opening-and-closing unit 110 is closed with the liquid crystal display monitor 115 inside to cover one of the side surfaces of the digital video camera 100. In this state, as shown in FIG. 7A, the lever pin 180 of the opening-and-closing lever 160 is positioned in the lowest position of the cam groove 150 of the hinge unit 120. Further, the lower portion 165b of the opening-and-closing lever 160 does not press down the switch lever 210, and the switch lever 210 is biased in the orientation of the OFF state.

FIG. 7B shows a state in which the opening-and-closing unit 110 is in the course of transition from the non-use state to a use-state. The cam groove 150 is formed to rise upward to the right (i.e., so as to form a part of the spiral) on the hinge case 230a. Therefore, as shown in FIG. 7B, as the opening-and-closing unit 110 opens on the digital video camera 100 (i.e., the opening-and-closing unit 110 is rotated about the hinge shaft 240a as an axis of rotation), the lever pin 180 of the opening-and-closing lever 160 moves from a lower side to an upper side along the cam groove 150 of the hinge unit 120. With this upward movement of the lever pin 180, the opening-and-closing lever 160 is rotated about the lever rotating shaft 170 as a center, so that the lower portion 165b of the opening-and-closing lever 160 starts to press down the switch lever 210. At this time, since the switch lever 210 is preliminarily biased to maintain the orientation of the OFF state, the lower portion 165b of the opening-and-closing lever 160 moves against the bias.

FIG. 7C shows the open state of the opening-and-closing unit 110, i.e., a state in which the liquid crystal display monitor 115 becomes usable. When the lower portion 165b of the opening-and-closing lever 160 moves against the bias on the switch lever 210, the lever pin 180 of the opening-and-closing lever 160 eventually reaches an upper end of the cam groove 150 of the hinge unit 120. At this time, the opening-and-closing lever 160 is rotated about the lever rotating shaft 170 as a center to press down the switch lever 210 to the orientation in the ON state. In this manner, the switch lever 210 becomes the ON state, and can transmit a signal indicating that the switch lever 210 is in the ON state to the other electronic components via the switch body 200.

As described above, the digital video camera 100 according to the present embodiment includes the housing 270, the opening-and-closing unit 110 capable of opening and closing in the direction orthogonal to the side surface of the housing 270 on the housing 270, the hinge unit 120 which openably and closably couples the opening-and-closing unit 110 on the housing 270 and which has the cam groove 150 formed thereon, the electronic control circuit board 220 which is arranged inside the housing 270 and is provided with the switch 190 for outputting a signal corresponding to opening and closing of the opening-and-closing unit 110, and the opening-and-closing lever 160 which moves in conjunction with the cam groove 150 formed in the hinge unit 120 along with the opening and closing of the opening-and-closing unit 110, the opening-and-closing lever 160 being movable in a direction parallel to the side surface of the housing 270 to perform ON/OFF control of the switch 190 of the electronic control circuit board 220.

According to the configuration described above, the opening-and-closing lever 160 moves in the direction parallel to the side surface of the housing to perform ON/OFF control of the switch 190 of the electronic control circuit board 220 in accordance with opening and closing of the opening-and-closing unit 110. Therefore, it is not necessary to ensure a space for arranging an opening-and-closing detecting mechanism in a direction orthogonal to the side surface of the housing of the digital video camera 100, so that the opening-and-closing detecting mechanism can be compactly arranged even in a limited space of the housing.

The cam groove 150 is formed in the shape of part of the spiral in the outer surface of the hinge unit 120. Specifically, the cam groove 150 is formed so as to obliquely extend from the end portion of the hinge unit 120 toward the central portion along a circumference of the hinge unit 120. With the cam groove 150 formed as described above, a rotational movement which opens the liquid crystal display monitor 115 in the direction (first direction) orthogonal to the side surface of the housing of the digital video camera 100 can be converted into a movement in the direction (second direction orthogonal to the first direction) parallel to the side surface of the housing of the digital video camera 100.

Note that, the length of the opening-and-closing lever 160 can be suitably adjusted according to a design concept. Even if the length of the opening-and-closing lever 160 is changed, a configuration of the opening-and-closing detecting mechanism may remain the same. When the hinge unit 120 and the electronic control circuit board 220 are spaced apart, increasing the length of the opening-and-closing lever 160 makes it possible to perform a switching operation.

The lever pin 180 moves along the cam groove 150 to rotate in the direction parallel to the side surface of the housing, along with the opening and closing of the opening-and-closing unit 110. In conjunction with this operation, the opening-and-closing lever 160 may transit between a state contacting with the switch 190 and a state not contacting with the switch 190 to perform ON/OFF control of the switch 190. That is, the move of the lever pin 180 along the cam groove allows the opening-and-closing lever 160 to rotate in the direction parallel to the side surface of the housing. The rotation of the opening-and-closing lever 160 makes the state of the opening-and-closing lever 160 contacting with the switch 190 or the state of the opening-and-closing lever 160 not contacting with the switch 190, thus enabling ON/OFF control of the switch 190.

The opening-and-closing unit 110 includes the liquid crystal display monitor 115. The switch 190 outputs a signal for controlling ON/OFF of a screen display of the liquid crystal display monitor 115.

Other Embodiments

The foregoing description has been made of the embodiment as an example of the technique disclosed in the present application. However, the technique according to the present disclosure is not limited thereto, and is applicable to embodiments in which modifications, substitutions, additions, omissions, and the like, are made as necessary.

Although the opening-and-closing unit 110 of the embodiment described above has the liquid crystal display monitor 115, it is not necessarily indispensable that the opening-and-closing unit has a liquid crystal display monitor. The opening-and-closing unit may be any member as long as it is openable and closable on a main body of a device.

In the embodiment described above, a digital video camera has been described as an example of an electronic device having an opening-and-closing unit. However, a device to be applied the concept of the present disclosure is not limited to a digital video camera. The concept of the present disclosure can be also applied to other imaging apparatus having an opening-and-closing mechanism, such as a digital still camera, and a foldable mobile phone. Thus, the concept of the present disclosure can be widely applied to the electronic device having an opening-and-closing mechanism.

The foregoing description has been made of the embodiments as examples of the technique according to the present disclosure. For this purpose, the accompanying drawings and the detailed description have been provided.

Accordingly, not only the essential constituent elements for solving the problem but also the nonessential constituent elements for solving the problem may be included among the constituent elements illustrated in the accompanying drawings and the detailed description, in order to exemplify the technique described above. Therefore, it should not be instantly construed that these nonessential components are essential based on the fact that these nonessential constituent elements are illustrated in the accompanying drawings and the detailed description.

Since the embodiments described above are provided for exemplifying the technique according to the present disclosure, various modifications, substitutions, additions, omissions, or the like, can be made thereto, without deviating from the scope of the claims and their equivalents.

INDUSTRIAL APPLICABILITY

The concept of the present disclosure is applicable to not only digital video cameras, but also any electronic devices having an opening-and-closing unit, such as digital still cameras, recording medium reproducing devices, mobile phones, and the like.

What is claimed is:

1. An electronic device comprising:
a housing;
an opening-and-closing unit disposed on a side surface of the housing, and configured to be openable and closable to the housing;
a hinge unit configured to have a cam groove formed thereon and openably and closably couple the opening-and-closing unit with the housing;
an electronic circuit board arranged inside the housing and having a switch which outputs a signal corresponding to a state of the switch; and
a movable member having a cam follower that moves within the cam groove formed in the hinge unit, as a result of the opening and closing of the opening-and-closing unit, the movable member being moved in a direction parallel to the side surface of the housing by movement of the cam follower within the cam groove to change the state of the switch.

2. The electronic device according to claim 1, wherein the cam follower of the movable member moves along the cam groove according to opening and closing of the opening-and-closing unit to rotate the movable member in a direction parallel to the side surface of the housing, causing the movable member to change between a state of contacting the switch and a state of not contacting the switch to change the state of the switch.

3. The electronic device according to claim 1, wherein the cam groove is formed on an outer surface of the hinge unit in a shape of a part of a spiral.

4. The electronic device according to claim 1, wherein
the opening-and-closing unit includes a display device, and
the switch outputs a signal for controlling ON/OFF of a screen display of the display device, according to the change in the state of the switch.

5. The electronic device according to claim 1, which is an imaging device.

6. The electronic device according to claim 2, wherein the cam groove is formed on an outer surface of the hinge unit in a shape of a part of a spiral.

7. The electronic device according to claim 2, wherein
the opening-and-closing unit includes a display device, and
the switch outputs a signal for controlling ON/OFF of a screen display of the display device, according to change in the state of the switch.

8. The electronic device according to claim 3, wherein
the opening-and-closing unit includes a display device, and
the switch outputs a signal for controlling ON/OFF of a screen display of the display device, according to change in the state of the switch.

9. The electronic device according to claim 2, which is an imaging device.

10. The electronic device according to claim 3, which is an imaging device.

11. The electronic device according to claim 4, which is an imaging device.

12. The electronic device according to claim 1, wherein the moveable member includes:
a shaft about which the movable member is rotatable in a direction parallel to the side surface of the housing,
a first portion radially extending from the shaft, and
wherein the cam follower is a lever pin attached to the first portion radially offset from the shaft.

13. The electronic device according to claim 12, wherein the movable member further includes a second portion radially extending from the shaft, and wherein the second portion is configured to selectively activate the switch when the movable member is rotated about the shaft by movement of the lever pin within the cam groove.

* * * * *